United States Patent
Fujita et al.

(10) Patent No.: US 8,594,888 B2
(45) Date of Patent: Nov. 26, 2013

(54) STEERING CONTROL APPARATUS

(75) Inventors: Yoshitaka Fujita, Susono (JP); Taro Hirose, Susono (JP); Theerawat Limpibunterng, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 500 days.

(21) Appl. No.: 13/001,928

(22) PCT Filed: Aug. 25, 2009

(86) PCT No.: PCT/JP2009/064799
§ 371 (c)(1),
(2), (4) Date: Dec. 29, 2010

(87) PCT Pub. No.: WO2011/024259
PCT Pub. Date: Mar. 3, 2011

(65) Prior Publication Data
US 2012/0029772 A1   Feb. 2, 2012

(51) Int. Cl.
*G06F 7/00*   (2006.01)
(52) U.S. Cl.
USPC ............ 701/41; 180/421; 180/6.24; 180/407; 701/90; 303/121; 303/147
(58) Field of Classification Search
USPC .............. 701/41, 90; 180/421–423, 6.24, 407; 303/121, 147
See application file for complete search history.

(56) References Cited

U.S. PATENT DOCUMENTS

| 4,074,648 A | * | 2/1978 | Reid et al. ............... 114/144 RE |
| 4,979,115 A |   | 12/1990 | Takahashi |
| 5,014,801 A |   | 5/1991 | Hirose |
| 2003/0122417 A1 |   | 7/2003 | Hackl et al. |
| 2005/0200088 A1 | * | 9/2005 | Sawada et al. ............. 280/5.507 |
| 2007/0176488 A1 | * | 8/2007 | Miyajima et al. ............ 303/146 |
| 2007/0185638 A1 |   | 8/2007 | Odenthal et al. |

(Continued)

FOREIGN PATENT DOCUMENTS

| DE | 39 03 834 A1 | 8/1989 |
| DE | 38 07 100 A1 | 9/1989 |

(Continued)

OTHER PUBLICATIONS

Improvement of vehicle handling by an integrated control system of four wheel steering and ESP with fuzzy logic approach; Hakima, A. ; Ameli, S.;Mechanical and Electrical Technology (ICMET), 2010 2nd International Conference on Digital Object Identifier: 10.1109/ICMET.2010.5598462; Publication Year: 2010 , pp. 738-744.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

A steering control apparatus (100) controls a steering mechanism to limit a behavior of a vehicle in the vehicle (10) equipped with the steering mechanism (200) which can independently steer front wheels and rear wheels. The steering control apparatus is provided with: a controlling device for controlling the steering mechanism such that a rudder angle of the front wheels and a rudder angle of the rear wheels are reverse-phased and such that a rudder angle speed of the front wheels is higher than a rudder angle speed of the rear wheels.

8 Claims, 5 Drawing Sheets

(56) References Cited

U.S. PATENT DOCUMENTS

| | | | |
|---|---|---|---|
| 2010/0100294 A1* | 4/2010 | Hirao et al. ............... | 701/68 |
| 2011/0246041 A1* | 10/2011 | Kato ............... | 701/70 |
| 2011/0264329 A1* | 10/2011 | Limpibunterng et al. ...... | 701/41 |
| 2012/0203431 A1* | 8/2012 | Kojo et al. ............... | 701/41 |

FOREIGN PATENT DOCUMENTS

| | | | |
|---|---|---|---|
| DE | 195 02 073 A1 | | 7/1996 |
| DE | 100 53 604 A1 | | 5/2002 |
| DE | 10 2004 035 004 A1 | | 2/2006 |
| JP | 1 309879 | | 12/1989 |
| JP | 3 67782 | | 3/1991 |
| JP | 04193686 A | * | 7/1992 |
| JP | 5 139325 | | 6/1993 |
| JP | 05310142 A | * | 11/1993 |
| JP | 2002 370665 | | 12/2002 |
| JP | 2004148891 A | | 5/2004 |
| JP | 2004237927 A | | 8/2004 |
| JP | 2005 145106 | | 6/2005 |
| JP | 2006 69496 | | 3/2006 |
| JP | 2006 123611 | | 5/2006 |
| JP | 2009 35148 | | 2/2009 |
| JP | 2010 528936 | | 8/2010 |

OTHER PUBLICATIONS

Designing a fuzzy logic controller to adjust the angle of tires in four wheel steering vehicles; Hakima, A.; Ameli, S.; Control Automation Robotics & Vision (ICARCV), 2010 11th International Conference on; Digital Object Identifier: 10.1109/ICARCV.2010.5707765; Publication Year: 2010, pp. 2208-2213.*

A historical review on lateral and longitudinal control of autonomous vehicle motions; Khodayari, A.; Ghaffari, A.; Ameli, S.; Flahatgar, J.; Mechanical and Electrical Technology (ICMET), 2010 2nd International Conference on Digital Object Identifier: 10.1109/ICMET.2010.5598396; Publication Year: 2010, pp. 421-429.*

Driving Control Algorithm for Maneuverability, Lateral Stability, and Rollover Prevention of 4WD Electric Vehicles With Independently Driven Front and Rear Wheels; Juyong Kang et al.; Vehicular Technology, IEEE Transactions on vol. 60, Issue: 7; Digital Object Identifier: 10.1109/TVT.2011.2155105; Pub. Year: 2011, pp. 2987-3001.*

International Search Report issued Dec. 1, 2009 in PCT/JP09/64799 filed Aug. 25, 2009.

* cited by examiner

STEERING CONTROL APPARATUS

TECHNICAL FIELD

The present invention relates to a steering control apparatus for controlling the steering of front and rear wheels in a vehicle equipped with a four wheel steering (4WS) mechanism which can steer the front and rear wheels.

BACKGROUND ART

As this type of steering control apparatus, there is known an apparatus for steering the rear wheels in a reverse phase to the front wheels, in the vehicle equipped with the 4WS mechanism (refer to patent documents 1 and 2).

For example, the patent document 1 discloses a technique in which the rear wheels are transiently steered with respect to the front wheels at the beginning of the turning of the vehicle. For example, the patent document 2 discloses a technique in which a transfer function for controlling the rudder angles of the front and rear wheels are approximated to include only a first-order term with a second-order term removed, thereby simplifying a system.

Patent document 1: Japanese Patent Application Laid Open No. H05-139325
Patent document 2: Japanese Patent Application Laid Open No. H03-67782

DISCLOSURE OF INVENTION

Subject to be Solved by the Invention

In the aforementioned case where the rear wheels are steered in the reverse phase to the front wheels, for example, if the target rudder angles of the front and rear wheels are calculated to generate a yaw moment and a lateral force which are steadily balanced with a yaw moment and a lateral force generated in the vehicle when there is a difference in braking force between the right and left wheels during the running of the vehicle, and if each of the front and rear wheels is controlled to have the target rudder angle, then, the balance of the yaw moment or the lateral force is not maintained in a transient period until the rudder angle of the front and rear wheels reaches to the target rudder angle, and the stability of the vehicle likely deteriorates, which is technically problematic.

In view of the aforementioned problems, it is therefore an object of the present invention to provide a steering control apparatus which can improve the stability of a vehicle in a steering control transient period in the vehicle equipped with a 4WS mechanism.

Means for Solving the Subject

The above object of the present invention can be achieved by a first steering control apparatus for controlling a steering mechanism to limit a behavior of a vehicle in the vehicle equipped with the steering mechanism which can independently steer front wheels and rear wheels, the steering control apparatus provided with: a controlling device for controlling the steering mechanism such that a rudder angle of the front wheels and a rudder angle of the rear wheels are reverse-phased and such that a rudder angle speed of the front wheels is higher than a rudder angle speed of the rear wheels.

The first steering control apparatus of the present invention is provided for the vehicle equipped with the steering mechanism, such as a four-wheel steering (4WS) mechanism, which can independently steer the front wheels and the rear wheels, and it controls the steering mechanism to limit the behavior of the vehicle (e.g. such that at least one of a target yaw moment and a target lateral force is generated in the vehicle).

According to the first steering control apparatus of the present invention, the behavior of the vehicle is limited by that the controlling device controls the steering mechanism such that the rudder angle of the front wheels and the rudder angle of the rear wheels are reverse-phased in its operation.

Particularly in the present invention, the controlling device controls the steering mechanism such that a rudder angle speed of the front wheels is higher than a rudder angle speed of the rear wheels. Thus, it is possible to limit or prevent that the stability of the vehicle deteriorates in a steering control transient period (e.g. a transient period until the front wheels and the rear wheels have a target front-wheel rudder angle and a target rear-wheel rudder angle, respectively) due to a difference in response characteristics between the front-wheel side and the rear-wheel side in the four-wheel steering mechanism and the like. In other words, particularly in the present invention, the controlling device controls the steering mechanism such that a rear-wheel rudder angle speed in which the rear wheels are steered (or which can be referred to as a "rear-wheel steering speed") is lower than a front-wheel rudder angle speed in which the front wheels are steered (or which can be referred to as a "front-wheel steering speed"). Thus, it is possible to limit or control that an unnecessary yaw moment or lateral force is generated in the vehicle due to the steering of the rear wheels, thereby improving the stability of the vehicle in the steering control transient period.

As explained above, according to the first steering control apparatus of the present invention, it is possible to improve the stability of the vehicle in the steering control transient period, in the vehicle equipped with the steering mechanism such as a four-wheel steering (4WS) mechanism.

In one aspect of the first steering control apparatus of the present invention, it is further provided with a target rudder angle specifying device for specifying a target front-wheel rudder angle, which is a target rudder angle of the front wheels, and a target rear-wheel rudder angle, which is a target rudder angle of the rear wheels and which is reverse-phased to the target front-wheel rudder angle, in order to limit the behavior of the vehicle, the controlling device controlling the steering mechanism such that the front wheels have the target front-wheel rudder angle at a front-wheel rudder angle speed and such that the rear wheels have the target rear-wheel rudder angle at a rear-wheel rudder angle speed, which is lower than the front-wheel rudder angle speed.

According to this aspect, the target rudder angle specifying device specifies the target front-wheel rudder angle and the target rear-wheel rudder angle, in order to limit the behavior of the vehicle (e.g. if a moment is generated in the vehicle due to a difference in braking force between the left wheels and the right wheels of the vehicle, then, in order to generate the target yaw moment, which is balanced with the aforementioned moment, in the vehicle). The controlling device controls the steering mechanism such that the front wheels and the rear wheels have the target front-wheel rudder angle and the target rear-wheel rudder angle, respectively.

Particularly in this aspect, the controlling device controls the steering mechanism such that the front wheels have the target front-wheel rudder angle at the front-wheel rudder angle speed and such that the rear wheels have the target rear-wheel rudder angle at the rear-wheel rudder angle speed, which is lower than the front-wheel rudder angle speed. Thus, it is possible to make it certain to limit or prevent that the stability of the vehicle deteriorates in the steering control transient period due to the difference in response characteristics between the front-wheel side and the rear-wheel side in the four-wheel steering mechanism and the like.

In another aspect of the first steering control apparatus of the present invention, it is further provided with: a target rudder angle speed specifying device for specifying a target front-wheel rudder angle speed, which is a target rudder angle speed of the front wheels, and a target rear-wheel rudder angle speed, which is a target rudder angle speed of the rear wheels, on the basis of the target front-wheel rudder angle and the target rear-wheel rudder angle; and a target rudder angle speed updating device for reducing the target rear-wheel rudder angle speed and for increasing the target front-wheel rudder angle speed in accordance with amount of the reduced speed.

According to this aspect, the target front-wheel rudder angle speed and the target rear-wheel rudder angle speed are specified by the target rudder angle speed specifying device, and the specified target front-wheel rudder angle speed and the specified target rear-wheel rudder angle speed are updated by the target rudder angle speed updating device, in order to limit the behavior of the vehicle.

Particularly in this aspect, the target rudder angle speed updating device reduces the target rear-wheel rudder angle speed and increases the target front-wheel rudder angle speed in accordance with the amount of the reduced speed. Thus, it is possible to make it certain to limit or prevent that the stability of the vehicle deteriorates in the steering control transient period due to the difference in response characteristics between the front-wheel side and the rear-wheel side in the four-wheel steering mechanism and the like.

In another aspect of the first steering control apparatus of the present invention, the controlling device controls the steering mechanism such that the rear-wheel rudder angle speed is less than or equal to an upper limit and such that the front-wheel rudder angle speed increases in accordance with an amount by which the rear-wheel rudder angle speed exceeds the upper limit.

According to this aspect, the steering mechanism is controlled by the controlling device such that the rear-wheel rudder angle speed is less than or equal to the upper limit. Thus, it is possible to make it certain to limit or prevent that the unnecessary yaw moment or lateral force is generated in the vehicle due to the steering of the rear wheels at the rudder angle speed which is higher than the upper value. Moreover, the steering mechanism is controlled by the controlling device such that the front-wheel rudder angle speed increases in accordance with the amount by which the rear-wheel rudder angle speed exceeds the upper limit. Thus, for example, it is possible to make it more certain to generate at least one of the target yaw moment and the target lateral force in the vehicle, thereby surely limiting the behavior of the vehicle. As a result, it is possible to further improve the stability of the vehicle in the steering control transient period.

Incidentally, the "amount by which the rear-wheel rudder angle speed exceeds the upper limit" means the deficiency of the rudder angle of the rear wheels with respect to the target rear-wheel rudder angle due to the control of the rudder angle of the rear wheels such that the rear-wheel rudder angle speed is less than or equal to the upper limit. In this case, the controlling device converts the deficiency of the rudder angle of the rear wheels with respect to the target rear-wheel rudder angle to the rudder angle of the front wheels, and it controls the front-wheel rudder angle speed such that the rudder angle of the front wheels increase by the amount of the converted rudder angle.

In another aspect of the first steering control apparatus of the present invention, the controlling device controls the steering mechanism such that at least one of a target yaw moment and a target lateral force, which limits the behavior of the vehicle, is generated in the vehicle.

According to this aspect, by generating at least one of the target yaw moment and the target lateral force in the vehicle, the behavior of the vehicle can be limited.

The above object of the present invention can be also achieved by a second steering control apparatus for controlling a steering mechanism to limit a behavior of a vehicle in the vehicle equipped with the steering mechanism which can independently steer front wheels and rear wheels, the steering control apparatus provided with: a target rudder angle specifying device for specifying a target front-wheel rudder angle, which is a target rudder angle of the front wheels, and a target rear-wheel rudder angle, which is a target rudder angle of the rear wheels and which is reverse-phased to the target front-wheel rudder angle; a target rudder angle updating device for updating the specified target front-wheel rudder angle and the specified target rear-wheel rudder angle by reducing the specified target rear-wheel rudder angle and by increasing the specified target front-wheel rudder angle; and a controlling device for controlling the steering mechanism on the basis of the updated target front-wheel rudder angle and the updated target rear-wheel rudder angle.

The second steering control apparatus of the present invention is provided for the vehicle equipped with the steering mechanism, such as a four-wheel steering (4WS) mechanism, which can independently steer the front wheels and the rear wheels, and it controls the steering mechanism to limit the behavior of the vehicle (e.g. such that at least one of the target yaw moment and the target lateral force is generated in the vehicle).

According to the second steering control apparatus of the present invention, the target front-wheel rudder angle and the target rear-wheel rudder angle are specified by the target rudder angle specifying device, in order to limit the behavior of the vehicle (e.g. on the basis of at least one of the target yaw moment and the target lateral force, which limit the behavior of the vehicle), in its operation. The specified target front-wheel rudder angle and the specified target rear-wheel rudder angle are updated by the target rudder angle updating device, and the steering mechanism is controlled by the controlling device on the basis of the updated target front-wheel rudder angle and the updated target rear-wheel rudder angle.

Particularly in the present invention, the target rudder angle updating device updates the specified target front-wheel rudder angle and the specified target rear-wheel rudder angle by reducing the specified target rear-wheel rudder angle and by increasing the specified target front-wheel rudder angle. For example, the target rudder angle updating device updates the target front-wheel rudder angle and the target rear-wheel rudder angle by reducing the target rear-wheel rudder angle specified by the target rudder angle specifying device and by increasing the target front-wheel rudder angle specified by the target rudder angle specifying device in accordance with the reduced amount of the target rear-wheel rudder angle. By that the steering mechanism is controlled by the controlling device on the basis of the target front-wheel rudder angle and the target rear-wheel rudder angle updated in this manner, the rear-wheel rudder angle speed in which the rear wheels are steered is reduced and the front-wheel rudder angle speed in which the front wheels are steered is increased, in comparison with a case where the steering mechanism is controlled on the basis of the target front-wheel rudder angle and the target rear-wheel rudder angle before the updating (i.e. specified by the target rudder angle specifying device).

Thus, it is possible to limit or prevent that the stability of the vehicle deteriorates in the transient period until the front wheels and the rear wheels have a target front-wheel rudder angle and a target rear-wheel rudder angle, respectively (i.e. the steering control transient period) due to the difference in response characteristics between the front-wheel side and the rear-wheel side in the four-wheel steering mechanism and the like. In other words, particularly in the present invention, the controlling device controls the steering mechanism such that the rear-wheel rudder angle speed is lower than the front-wheel rudder angle speed, on the basis of the target front-wheel rudder angle and the target rear-wheel rudder angle updated by the target rudder angle updating device. Thus, it is possible to limit or control that the unnecessary yaw moment or lateral force is generated in the vehicle due to the steering of the rear wheels, thereby improving the stability of the vehicle in the steering control transient period.

As explained above, according to the second steering control apparatus of the present invention, it is possible to improve the stability of the vehicle in the steering control transient period, in the vehicle equipped with the steering mechanism such as a four-wheel steering (4WS) mechanism.

In one aspect of the second steering control apparatus of the present invention, the target rudder angle updating device increases the specified target front-wheel rudder angle in accordance with an amount by which the specified target rear-wheel rudder angle is reduced.

According to this aspect, it is possible to make it more certain to generate at least one of the target yaw moment and the target lateral force in the vehicle, thereby surely limiting the behavior of the vehicle. Thus, it is possible to further improve the stability of the vehicle in the steering control transient period.

In the aforementioned aspect in which the target rudder angle updating device increases the specified target front-wheel rudder angle in accordance with the amount by which the specified target rear-wheel rudder angle is reduced, the target rudder angle updating device determines the amount by which the specified target rear-wheel rudder angle is reduced, on the basis of a control function including a ratio between a transfer function of a lateral force generated in the vehicle with respect to a rudder angle of the front wheels and a transfer function of a lateral force generate in the vehicle with respect to a rudder angle of the rear wheels, from which a second-order term is removed.

In this case, it is possible to reduce the amount of arithmetic operation, which is by the target rudder angle updating device configured as a part of a computer system and which is for determining the amount by which the target rear-wheel rudder angle specified by the target rudder angle specifying device is reduced. Therefore, the amount by which the target rear-wheel rudder angle specified by the target rudder angle specifying device is reduced can be quickly determined by the target rudder angle updating device. Moreover, the structure of the steering control apparatus can be also simplified.

The operation and other advantages of the present invention will become more apparent from the embodiment explained below.

MODE FOR CARRYING OUT THE INVENTION

Hereinafter, an embodiment of the present invention will be explained with reference to the drawings.

Firstly, with reference to FIG. 1, an explanation will be given on the structure of a vehicle to which a steering control apparatus in this embodiment is applied.

Figure 1:
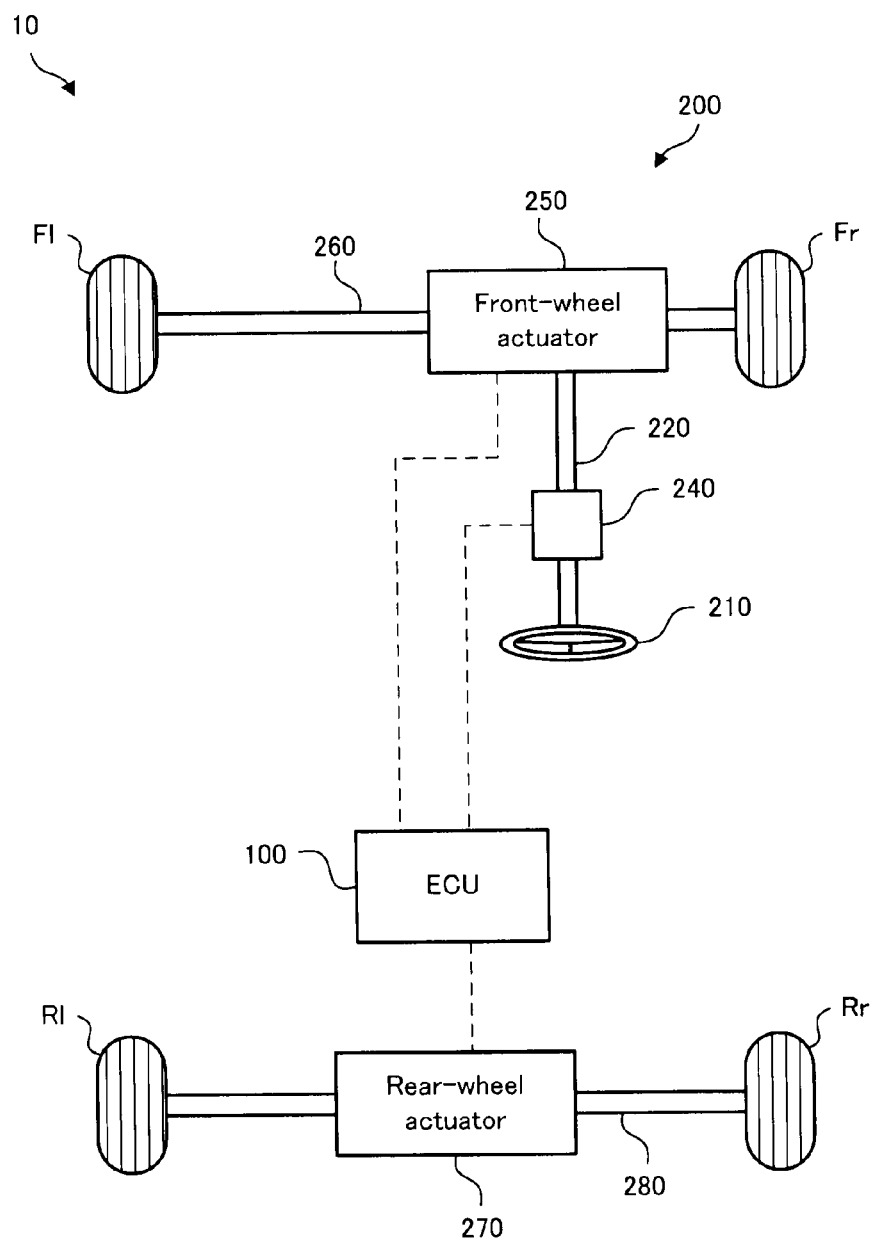
FIG. 1 is a block diagram conceptually showing the structure of a vehicle in an embodiment.

FIG. 1 is a block diagram conceptually showing the structure of the vehicle in the embodiment. Incidentally, FIG. 1 mainly shows the structure of a part related to the steering control apparatus in the embodiment in the vehicle in the embodiment.

In FIG. 1, a vehicle 10 in the embodiment is provided with a left front wheel Fl and a right front wheel Fr (hereinafter abbreviated to "front wheels F" as occasion demands), a left rear wheel Rl and a right rear wheel Rr (hereinafter abbreviated to "rear wheels R" as occasion demands), a four-wheel steering mechanism 200, and an ECU 100.

The ECU 100 is provided with a CPU (Central Processing Unit), a ROM (Read Only Memory), and a RAM (Random Access Memory). The ECU 100 is an electronic control unit adapted to control all the operations of the vehicle 10, and it functions as one example of the "steering control apparatus" of the present invention. Incidentally, although the ECU 100 is a one-body (or unified) electronic control unit which functions as one example of each of the "controlling device", the "target rudder angle specifying device" and the "target rudder angle updating device" of the present invention, the physical, mechanical and electrical configurations of each of the devices of the present invention are not limited to the above example but may be configured as various computer systems such as a plurality of ECUs, various processing units, various controllers or microcomputer apparatuses.

The four-wheel steering mechanism 200 is one example of the "steering mechanism" of the present invention. The four-wheel steering mechanism 200 is provided with a steering wheel 210, a steering shaft 220, a steering angle sensor 240, a front-wheel actuator 250, a front-wheel steering shaft 260, a rear-wheel actuator 270, and a rear-wheel steering shaft 280. The four-wheel steering mechanism 200 can independently steer the front wheels F and the rear wheels R.

The steering wheel 210 is a physical operating device in which steering input can be performed by a driver.

The steering shaft 220 is a shaft which can rotate in association with the turn of the steering wheel 210.

The steering angle sensor 240 is a sensor capable of detecting a steering angle, which is the steering amount of the steering wheel 210. The steering angle sensor 240 is electrically connected to the ECU 100, and the detected steering angle is recognized by the ECU 100 with a regular or irregular period.

The front-wheel actuator 250 can steer the front wheels F by moving the front-wheel steering shaft 260, which interconnects the left front wheel Fl and the right front wheel Fr, in a horizontal direction in FIG. 1. The front-wheel actuator 250 is electrically connected to the ECU 100, and the rudder angle of the front wheels F is controlled by the ECU 100. Incidentally, in addition, the front-wheel actuator 250 applies a driving force to the front-wheel steering shaft 260 in the horizontal direction in FIG. 1, under the control of the ECU 100. If the front-wheel steering shaft 260 is displaced in the horizontal direction, the left front wheel Fl and the right front wheel Fr connected to the front-wheel steering shaft 260 via a tie rod, knuckles, etc. turn around in the same direction.

The rear-wheel actuator 270 can steer the rear wheels R by moving the rear-wheel steering shaft 280, which interconnects the left rear wheel Rl and the right rear wheel Rr, in the horizontal direction in FIG. 1. The rear-wheel actuator 270 is electrically connected to the ECU 100, and the rudder angle of the rear wheels R is controlled by the ECU 100. Incidentally, in addition, the rear-wheel actuator 270 applies a driving force to the rear-wheel steering shaft 280 in the horizontal direction in FIG. 1, under the control of the ECU 100. If the rear-wheel steering shaft 280 is displaced in the horizontal direction, the left rear wheel Rl and the right rear wheel Rr connected to the rear-wheel steering shaft 280 via a tie rod, knuckles, etc. turn around in the same direction.

Next, steering control by the ECU 100, which functions as the steering control apparatus in the embodiment, will be explained with reference to FIG. 2 to FIG. 4.

Hereinafter, an explanation will be given on the steering control by the ECU 100 in a case where there is a difference in braking force between the left wheels and the right wheels due to different road conditions on the left wheels (i.e. the left front wheel Fl and the left rear wheel Rl) and the right wheels (i.e. the right front wheel Fr and the right rear wheel Rr). Incidentally, hereinafter, the difference in braking force generated between the left wheels and the right wheels is referred to as a "right-left difference in braking force", as occasion demands.

Figure 2:
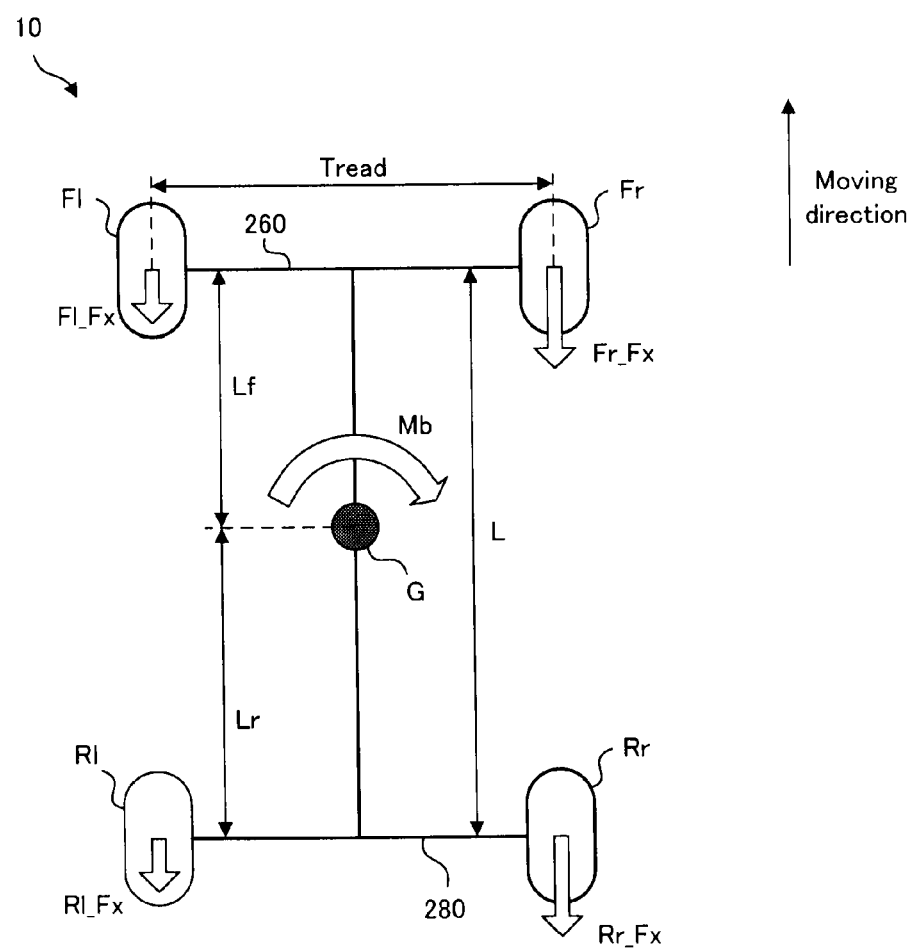
FIG. 2 is a schematic diagram conceptually showing a moment generated in the vehicle due to the generation of a right-left difference in braking force.

FIG. 2 is a schematic diagram conceptually showing a moment generated in the vehicle due to the generation of the right-left difference in braking force.

In FIG. 2, it is assumed that a braking force Fl_Fx is acted on the left front wheel Fl, a braking force Fr_Fx is acted on the right front wheel Fr, a braking force Rl_Fx is acted on the left rear wheel Rl, and a braking force Rr_Fx is acted on the right rear wheel Fl, by a braking operation by the driver during the running of the vehicle 10. The right-left difference in braking control $\Delta Fx$ can be expressed by the following equation (1). Incidentally, FIG. 2 shows a case where the braking forces Fr_Fx and Rr_Fx acted on the right wheels are greater than the braking forces Fl_Fx and Rl_Fx acted on the left wheels, as an example.

$$\Delta Fx = (Fr\_Fx + Rr\_Fx) - (Fl\_Fx - Rl\_Fx) \quad (1)$$

Moreover, a moment Mb around the center of gravity G of the vehicle 10 generated by the right-left difference in braking control $\Delta Fx$ can be expressed by the following equation (2).

$$Mb = \Delta Fx/(\text{Tread}/2) \quad (2)$$

Here, Tread is a distance between the left wheels and the right wheels.

Figure 3:
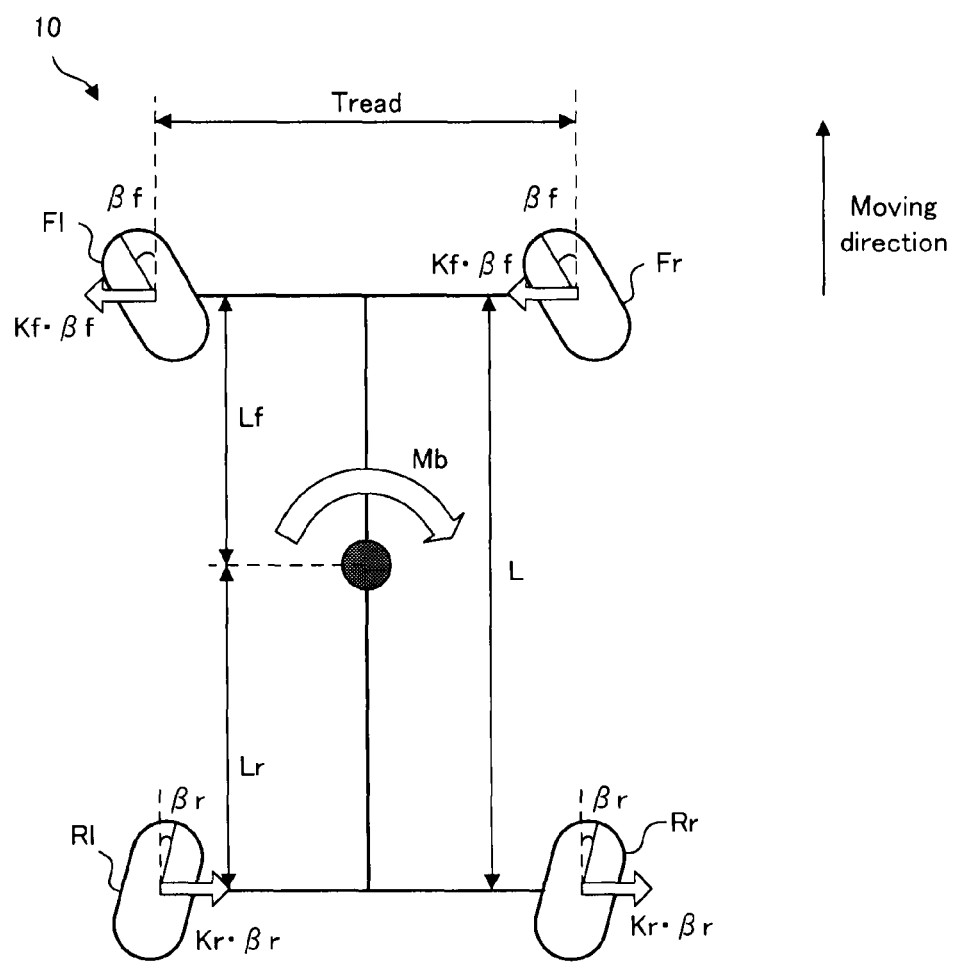
FIG. 3 is a schematic diagram for explaining a target front-wheel rudder angle βf and a target rear-wheel rudder angle βr.

FIG. 3 is a schematic diagram for explaining a target front-wheel rudder angle $\beta f$ and a target rear-wheel rudder angle $\beta r$.

In FIG. 3, the ECU 100 specifies the target front-wheel rudder angle $\beta f$ and the target rear-wheel rudder angle $\beta r$ in order to cancel the moment Mb which is generated by the right-left difference in braking control $\Delta Fx$ and in order not to generate a lateral force in the vehicle 10.

Specifically, the target front-wheel rudder angle $\beta f$ and the target rear-wheel rudder angle $\beta r$ can be specified by the following equations (3) and (4) and expressed by the following equations (5) and (6).

$$Mb = 2 \cdot Kf \cdot \beta f \cdot Lf - 2 \cdot Kr \cdot \beta r \cdot Lr \quad (3)$$

$$Kf \cdot \beta f + Kr \cdot \beta r = 0 \quad (4)$$

$$\beta f = -Mb/\{2 \cdot (L \cdot Kf)\} \quad (5)$$

$$\beta r = Mb/\{2 \cdot (L \cdot Kr)\} \quad (6)$$

Here, Kf is the cornering power of the front wheels F, Kr is the cornering power of the rear wheels R, Lf is a distance between the front-wheel steering shaft 260 and the center of gravity G, Lr is a distance between the rear-wheel steering shaft 280 and the center of gravity G, and L is a distance between the front-wheel steering shaft 260 and the rear-wheel steering shaft 280. Incidentally, the following equation holds true: L=Lf+Lr.

The above equation (3) is the equation of motion indicating that a yaw moment is balanced with the moment Mb generated by the right-left difference in braking control $\Delta Fx$, wherein the yaw moment is generated by that the front wheels F and the rear wheels R have the target front-wheel rudder angle $\beta f$ and the target rear-wheel rudder angle $\beta r$, respectively. Moreover, the above equation (4) is the equation of motion indicating that a lateral force (or cornering force) generated in the vehicle 10 becomes zero, wherein the lateral force is generated by that the front wheels F and the rear wheels R have the target front-wheel rudder angle $\beta f$ and the target rear-wheel rudder angle $\beta r$, respectively. In other words, in the embodiment, the target front-wheel rudder angle $\beta f$ and the target rear-wheel rudder angle $\beta r$ are specified by the ECU 100 in the condition that the moment balanced with the moment Mb generated by the right-left difference in braking control $\Delta Fx$ (i.e. the moment with the same magnitude as and an opposite direction to those of the moment Mb) is a target yaw moment and that zero is a target lateral force. In other words, the target front-wheel rudder angle $\beta f$ and the target rear-wheel rudder angle $\beta r$ are specified by the ECU 100 in order to limit or control the behavior of the vehicle due to the right-left difference in braking control $\Delta Fx$. Incidentally, as described later, the ECU 100 updates the specified target front-wheel rudder angle $\beta f$ and the specified target rear-wheel rudder angle $\beta r$.

As shown in the above equations (5) and (6), the target front-wheel rudder angle $\beta f$ and the target rear-wheel rudder angle $\beta r$ are reverse-phased to each other. In other words, as shown in FIG. 3, the front wheels F and the rear wheels R are steered to turn in the opposite directions to each other with respect to a moving direction.

Figure 4:
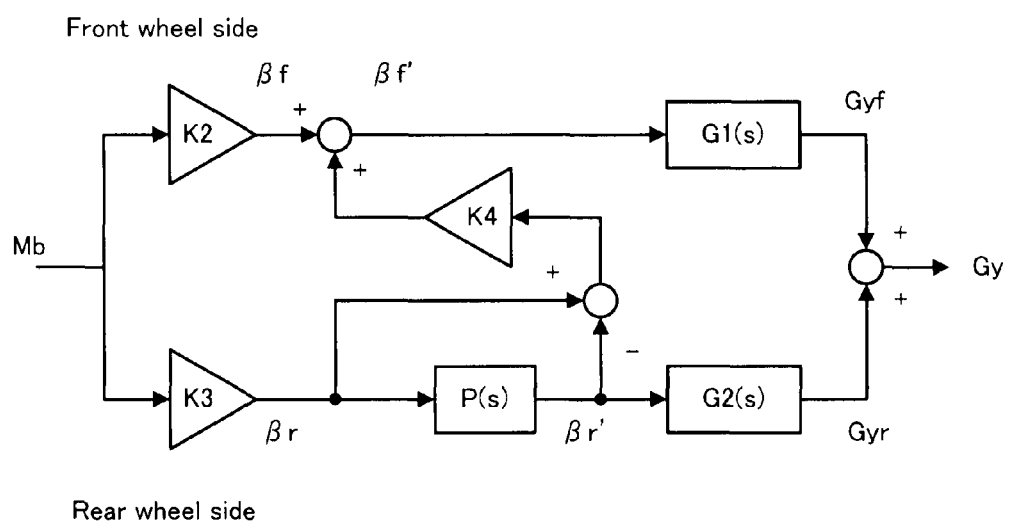
FIG. 4 is a block diagram for explaining steering control in the embodiment.

FIG. 4 is a block diagram for explaining the steering control by the ECU which functions as the steering control apparatus in the embodiment.

In FIG. 4, the ECU 100 specifies the target front-wheel rudder angle $\beta f$ and the target rear-wheel rudder angle $\beta r$ in the condition that the moment balanced with the moment Mb generated by the right-left difference in braking control $\Delta Fx$ is the target yaw moment. Specifically, the ECU 100 specifies the target front-wheel rudder angle $\beta f$ and the target rear-wheel rudder angle $\beta r$ by proportional elements K2 and K3 with respect to the moment Mb, respectively, Here, the proportional elements K2 and K3 are expressed by the following equations (7) and (8).

$$K2 = -1/(2 \cdot Kf \cdot L) \quad (7)$$

$$K3 = 1/(2 \cdot K \cdot L) \quad (8)$$

In other words, the proportional element K2 is a proportional constant showing a ratio of the target front-wheel rudder angle $\beta f$ to the moment Mb in the above equation (5), and the proportional element K3 is a proportional constant showing a ratio of the target rear-wheel rudder angle $\beta r$ to the moment Mb in the above equation (6). That is, the ECU 100 firstly specifies the target front-wheel rudder angle βf and the target rear-wheel rudder angle βr on the basis of the above equations (5) and (6) in the condition that the moment balanced with the moment Mb generated by the right-left difference in braking control ΔFx is the target yaw moment.

Particularly in the embodiment, the ECU 100 updates the target rear-wheel rudder angle βr (wherein the updated target rear-wheel rudder angle is referred to as βr') by reducing the target rear-wheel rudder angle βr, and it updates the target front-wheel rudder angle βf (wherein the updated target front-wheel rudder angle is referred to as βf') by increasing the target front-wheel rudder angle βf.

Specifically, the ECU 100 updates the target rear-wheel rudder angle βr by a filter, which is expressed by a transfer function P(s) shown by the following equation (9), to be the target rear-wheel rudder angle βr'. Incidentally, the transfer function P(s) is one example of the "control function" of the present invention. A method of deriving the transfer function P(s) will be described later. Moreover, the following equation holds true: βr'=P(s)·βr.

[Equation 1]

$$P(s) = \frac{Kr - Kf}{Kr} \cdot \frac{1}{1 + \frac{Kf}{Kr} \cdot \frac{G2(s)}{G1(s)}} \quad (9)$$

Here, s is a Laplace operator, G1(s) is a transfer function of a lateral force Gy with respect to a front-wheel rudder angle δf, and G2(s) is a transfer function of the lateral force Gy with respect to a rear-wheel rudder angle δr. The transfer functions G1(s) and G2(s) are expressed by the following equations (10) and (11), respectively.

[Equation 2]

$$G1(s) = \frac{Gy}{\delta f} \quad (10)$$

$$= \frac{V \cdot \left(2 \cdot Kf \cdot s^2 + \frac{4}{V} \cdot L \cdot Lr \cdot Kf \cdot s + 4 \cdot L \cdot Kf \cdot Kr\right)}{m \cdot V \cdot I \cdot s^2 + \{2 \cdot m \cdot (Lf^2 \cdot Kf + Lr^2 \cdot Kr) + 2 \cdot I \cdot (Kf + Kr)\} \cdot s + \left\{\frac{4}{V} \cdot L^2 \cdot Kf \cdot Kr - 2 \cdot m \cdot V \cdot (Lf \cdot Kf - Lr \cdot Kr)\right\}}$$

[Equation 3]

$$G2(s) = \frac{Gy}{\delta r} \quad (11)$$

$$= \frac{V \cdot \left(2 \cdot Kr \cdot s^2 + \frac{4}{V} \cdot L \cdot Lr \cdot Kf \cdot s - 4 \cdot L \cdot Kf \cdot Kr\right)}{m \cdot V \cdot I \cdot s^2 + \{2 \cdot m \cdot (Lf^2 \cdot Kf + Lr^2 \cdot Kr) + 2 \cdot I \cdot (Kf + Kr)\} \cdot s + \left\{\frac{4}{V} \cdot L^2 \cdot Kf \cdot Kr - 2 \cdot m \cdot V \cdot (Lf \cdot Kf - Lr \cdot Kr)\right\}}$$

Here, m is a vehicle weight, V is a vehicle speed, and I is a yaw angle inertia moment.

Moreover, the ECU 100 updates the target front-wheel rudder angle βf by increasing it in accordance with a difference in the target rear-wheel rudder angle between before and after the updating (i.e. a difference between the front-wheel rudder angles βr and βr'), to be the target front-wheel rudder angle βf'. Specifically, as illustrated in the block diagram shown in FIG. 4, the updating is performed on the basis of the following equation (12).

$$\beta\beta f' = \beta f + K4 \cdot (\beta r - \beta r') = \{K2 + K4 \cdot (1 - P(s)) \cdot K3\} \cdot Mb \quad (12)$$

Here, a proportional element K4 is expressed by the following equation (13).

$$K4 = -Kr/Kf \quad (13)$$

The proportional element K4 is expressed by a ratio in cornering power between the front wheels F and the rear wheels R, and it is to convert the difference in the target rear-wheel rudder angle between before and after the updating to a rudder angle to be added to the target front-wheel rudder angle.

The ECU 100 controls the front-wheel steering mechanism 200 such that the front wheels F and the rear wheels R have the target front-wheel rudder angle βf' and the target rear-wheel rudder angle βr' updated in this manner, respectively.

Here, an explanation will be given on the method of deriving the transfer function P(s) described above with reference to the above equation (9).

In the steering control described above with reference to FIG. 4, a lateral force Gyf generated by the front-wheel rudder angle and a lateral force Gyr generated by the rear-wheel rudder angle are expressed by the following equations (14) and (15), respectively.

$$Gyf = (K2 + K4 \cdot (1 - P(s)) \cdot K3) \cdot G1(s) \cdot Mb \quad (14)$$

$$Gyr = K3 \cdot P(s) \cdot G2(s) \cdot Mb \quad (15)$$

Moreover, the lateral force Gy generated in the vehicle at this time is a sum of the lateral force Gyf and the lateral force Gyr, and it is expressed by the following equation (16).

$$Gy = Gyf + Gyr \quad (16)$$

On the other hand, in a case where the vehicle 10 is two-wheel steering (2WS) for steering only the front wheels F, a lateral force Gy2ws is expressed by the following equation (17), wherein the lateral force Gy2ws is generated in the vehicle 10 when the front wheels are steered so as to generate a moment balanced with the moment Mb generated by the right-left difference in braking control ΔFx.

$$Gy2ws = K1 \cdot G1(s) \cdot Mb \quad (17)$$

Here, K1 is expressed by the following equation (18).

$$K1 = -(Kf + Kr)/(2 \cdot L \cdot Kf \cdot Kr) \quad (18)$$

In the embodiment, the transfer function P(s) is derived in the condition that the lateral force Gy generated in the vehicle 10 is equal to the lateral force Gy2ws. In other words, the transfer function P(s) can be derived as in the above equation (9) on the basis of the above equations (14) to (18) in the condition that Gyf+Gyr=Gy2ws.

Figure 5:
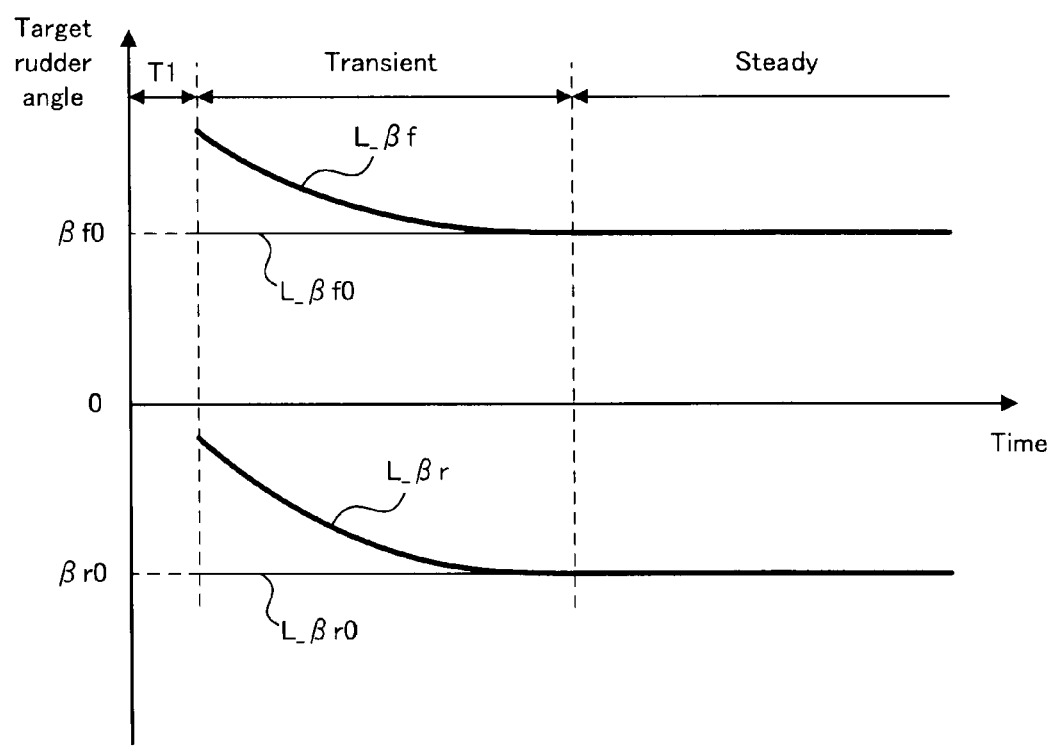
FIG. 5 is a graph showing a change with time in the target front-wheel rudder angle and the target rear-wheel rudder angle, in the steering control in the embodiment.

Next, with reference to FIG. 5, an explanation will be added to the steering control by the ECU 100.

FIG. 5 is a graph showing a change with time in the target front-wheel rudder angle and the target rear-wheel rudder angle, in the steering control in the embodiment.

In FIG. 5, a curve L_βf shows one example of the change with time in the target front-wheel rudder angle βf, and a curve L_βr shows one example of the change with time in the target rear-wheel rudder angle βr. Moreover, in FIG. 5, a straight line L_βf0 and a straight line L_βr0 respectively express the target front-wheel rudder angle and the target rear-wheel rudder angle when there are no proportional element K4 and no filter expressed by the transfer function P(s) (i.e. the target front-wheel rudder angle βf expressed by the above equation (5) (hereinafter referred to as a "steady target front-wheel rudder angle βf0" as occasion demands) and the target rear-wheel rudder angle βr expressed by the above equation (6) (hereinafter referred to as a "steady target rear-wheel rudder angle βr0" as occasion demands)), in the steering control described above with reference to FIG. 4. The steady target front-wheel rudder angle βf0 and the steady target rear-wheel rudder angle βr0 are the target front-wheel rudder angle and the target rear-wheel rudder angle, which can realize a steady balance in the moment and the lateral force in the vehicle 10, respectively. Moreover, a period T1 in FIG. 5 is a delay period taken in consideration of the rise time of the front-wheel actuator 250 and the rear-wheel actuator 270 at the start of the steering control, or the like.

In FIG. 5, since the ECU 100 performs the steering control described above with reference to FIG. 4 in the embodiment, the target rear-wheel rudder angle βr gradually increases from a value less than the steady target rear-wheel rudder angle βr0 to the steady target rear-wheel rudder angle βr0 (refer to the curve L_βr), and the target front-wheel rudder angle βf gradually decreases from a value greater than the steady target front-wheel rudder angle βf0 to the steady target front-wheel rudder angle βf0 (refer to the curve L_βf), in the steering control transient period. Incidentally, in FIG. 5, the target rear-wheel rudder angle is represented as a negative value in order to show that the target rear-wheel rudder angle is reverse-phased to the target front-wheel rudder angle. The large (or small) target rear-wheel rudder angle means its large (or small) absolute value.

In other words, in the embodiment, the ECU 100 controls the four-wheels steering mechanism 200 to relatively reduce a rear-wheel rudder angle speed for steering the rear wheels R and to relatively increase a front-wheel rudder angle speed for steering the front wheels F.

Thus, it is possible to limit or prevent that the stability of the vehicle 10 deteriorates in the transient period until the front wheels F and the rear wheels R have the steady target front-wheel rudder angle βf0 and the steady target rear-wheel rudder angle βr0, respectively, due to a difference in response characteristics between the front-wheel actuator 250 and the rear-wheel actuator 270 in the four-wheel steering mechanism 200 and the like. For example, it is possible to limit or prevent that an unnecessary moment is generated in the same direction as that of the moment Mb generated by the right-left difference in braking control ΔFx, due to the steering of the rear wheels R, in a case where the rear-wheel rudder angle speed is greater than the front-wheel rudder angle speed due to the difference in response characteristics between the front-wheel actuator 250 and the rear-wheel actuator 270 in the four-wheel steering mechanism 200.

In other words, particularly in the embodiment, the ECU 100 controls the four-wheels steering mechanism 200 such that the rear-wheel rudder angle speed is less than the front-wheel rudder angle speed on the basis of the updated target front-wheel rudder angle βf' and the updated target rear-wheel rudder angle βr'. Thus, it is possible to limit or control that the unnecessary yaw moment or lateral force is generated in the vehicle 10 due to the steering of the rear wheels R, thereby improving the stability of the vehicle 10 in the steering control transient period.

As explained above, according to the embodiment, it is possible to improve the stability of the vehicle 10 in the steering control transient period, in the vehicle 10 equipped with the four-wheel steering mechanism 200.

First Modified Example

In the aforementioned transfer function P(s), the second-order term of the Laplace operator may be removed. In other words, a ratio of the transfer function G1(s) expressed by the above equation (10) and the transfer function G2(s) expressed by the above equation (11) included in the transfer function P(s) as shown in the above equation (9), G1(s)/G2(s), may be approximated as the following equation (19).

[Equation 4]

$$\frac{G2(s)}{G1(s)} = \frac{\frac{4}{V} \cdot L \cdot Lr \cdot Kf \cdot s - 4 \cdot L \cdot Kf \cdot Kr}{\frac{4}{V} \cdot L \cdot Lr \cdot Kf \cdot s + 4 \cdot L \cdot Kf \cdot Kr} \quad (19)$$

In this case, it is possible to reduce the amount of the arithmetic operation associated with the updating of the target front-wheel rudder angle and the target rear-wheel rudder angle by the ECU 100 and to improve the operation speed associated with the updating. The improvement in the operation speed is extremely useful in practice.

Second Modified Example

In FIG. 4, the ECU 100 may update the target front-wheel rudder angle and the target rear-wheel rudder angle such that the rear-wheel rudder angle speed is less than or equal to an upper limit and such that the front-wheel rudder angle speed increases in accordance with an amount by which the rear-wheel rudder angle speed exceeds the upper limit, in addition to or instead of the updating of the target front-wheel rudder angle and the target rear-wheel rudder angle using the transfer function P(s) and the proportional element K4 described above.

In this case, the four-wheel steering mechanism 200 is controlled by the ECU 100 such that the rear-wheel rudder angle speed is less than or equal to the upper limit. Thus, it is possible to make it certain to limit or prevent that the unnecessary yaw moment or lateral force is generated in the vehicle 10 due to the steering of the rear wheels R at the rudder angle speed which is higher than the upper limit. Moreover, the four-wheel steering mechanism 200 is controlled by the ECU 100 such that the front-wheel rudder angle speed increases in accordance with the amount by which the rear-wheel rudder angle speed exceeds the upper limit. Thus, it is possible to make it more certain to generate the target yaw moment in the vehicle 10 even in the steering control transient period. As a result, it is possible to further improve the stability of the vehicle 10 in the steering control transient period.

Third Modified Example

In FIG. 1 and FIG. 5, the ECU 100 may specify the target front-wheel rudder angle speed and the target rear-wheel rudder angle speed on the basis of the steady target front-wheel rudder angle βf0 and the steady target rear-wheel rudder angle βr0, and then reduce a part of the specified target rear-wheel rudder angle speed and increase the target front-wheel rudder angle speed in accordance with the reduced part (i.e. the amount of the rudder angle speed reduced). In other words, the ECU 100 may specify the target front-wheel rudder angle speed and the target rear-wheel rudder angle speed on the basis of the steady target front-wheel rudder angle βf0 and the steady target rear-wheel rudder angle βr0, and then add a part of the specified target rear-wheel rudder angle speed to the target front-wheel rudder angle speed (i.e. as for the specified target rudder angle speeds on the front-wheel side and the rear-wheel side, the ECU 100 may convert a part of the target rudder angle speed on the rear-wheel side to the target rudder angle speed on the front-wheel side and transfer it to the front side, thereby updating the target rudder angle speeds on the front-wheel side and the rear-wheel side). By this, the four-wheel steering mechanism 200 is controlled by the ECU 100 such that the front wheels and the rear wheels have the steady target front-wheel rudder angle βf0 and the steady target rear-wheel rudder angle βr0, respectively, with the front wheels having the higher rudder angle speed than the rear wheels. Thus, it is possible to limit or prevent that the stability of the vehicle 10 deteriorates in the steering control transient period due to a difference in response characteristics between the front-wheel side and the rear-wheel side in the four-wheel steering mechanism 200 and the like.

The present invention is not limited to the aforementioned embodiment, but various changes may be made, if desired, without departing from the essence or spirit of the invention which can be read from the claims and the entire specification. A steering control apparatus, which involves such changes, is also intended to be within the technical scope of the present invention.

INDUSTRIAL APPLICABILITY

The present invention can be used for a steering control apparatus for controlling the steering of front and rear wheels in a vehicle equipped with a four wheel steering mechanism which can steer the front and rear wheels.

DESCRIPTION OF REFERENCE CODES

10 vehicle
100 ECU
200 four-wheel steering mechanism
210 steering wheel
220 steering shaft
240 steering angle sensor
250 front-wheel actuator
260 front-wheel steering shaft
270 rear-wheel actuator
280 rear-wheel steering shaft
Fl left front wheel
Fr right front wheel
Rl left rear wheel
Rr right rear wheel.

The invention claimed is:

1. A steering control apparatus for controlling a steering mechanism to limit a behavior of a vehicle in the vehicle equipped with the steering mechanism which can independently steer front wheels and rear wheels, said steering control apparatus comprising:
a controlling device for controlling the steering mechanism such that a rudder angle of the front wheels and a rudder angle of the rear wheels are reverse-phased and such that a rudder angle speed of the front wheels is higher than a rudder angle speed of the rear wheels.

2. The steering control apparatus according to claim 1, further comprising a target rudder angle specifying device for specifying a target front-wheel rudder angle, which is a target rudder angle of the front wheels, and a target rear-wheel rudder angle, which is a target rudder angle of the rear wheels and which is reverse-phased to the target front-wheel rudder angle, in order to limit the behavior of the vehicle, said controlling device controlling the steering mechanism such that the front wheels have the target front-wheel rudder angle at a front-wheel rudder angle speed and such that the rear wheels have the target rear-wheel rudder angle at a rear-wheel rudder angle speed, which is lower than the front-wheel rudder angle speed.

3. The steering control apparatus according to claim 1, further comprising:
a target rudder angle speed specifying device for specifying a target front-wheel rudder angle speed, which is a target rudder angle speed of the front wheels, and a target rear-wheel rudder angle speed, which is a target rudder angle speed of the rear wheels, on the basis of the target front-wheel rudder angle and the target rear-wheel rudder angle; and
a target rudder angle speed updating device for reducing the target rear-wheel rudder angle speed and for increasing the target front-wheel rudder angle speed in accordance with amount of the reduced speed.

4. The steering control apparatus according to claim 2, wherein said controlling device controls the steering mechanism such that the rear-wheel rudder angle speed is less than or equal to an upper limit and such that the front-wheel rudder angle speed increases in accordance with an amount by which the rear-wheel rudder angle speed exceeds the upper limit.

5. The steering control apparatus according to any one of claims 1 to 3, wherein said controlling device controls the steering mechanism such that at least one of a target yaw moment and a target lateral force, which limits the behavior of the vehicle, is generated in the vehicle.

6. A steering control apparatus for controlling a steering mechanism to limit a behavior of a vehicle in the vehicle equipped with the steering mechanism which can independently steer front wheels and rear wheels, said steering control apparatus comprising:
a target rudder angle specifying device for specifying a target front-wheel rudder angle, which is a target rudder angle of the front wheels, and a target rear-wheel rudder angle, which is a target rudder angle of the rear wheels and which is reverse-phased to the target front-wheel rudder angle;
a target rudder angle updating device for updating the specified target front-wheel rudder angle and the specified target rear-wheel rudder angle by reducing the specified target rear-wheel rudder angle and by increasing the specified target front-wheel rudder angle; and
a controlling device for controlling the steering mechanism on the basis of the updated target front-wheel rudder angle and the updated target rear-wheel rudder angle.

7. The steering control apparatus according to claim 6, wherein said target rudder angle updating device increases the specified target front-wheel rudder angle in accordance with an amount by which the specified target rear-wheel rudder angle is reduced.

8. The steering control apparatus according to claim 6, wherein said target rudder angle updating device determines the amount by which the specified target rear-wheel rudder angle is reduced, on the basis of a control function including a ratio between a transfer function of a lateral force generated in the vehicle with respect to a rudder angle of the front wheels and a transfer function of a lateral force generated in the vehicle with respect to a rudder angle of the rear wheels, from which a second-order term is removed.

* * * * *